United States Patent Office 2,779,651
Patented Jan. 29, 1957

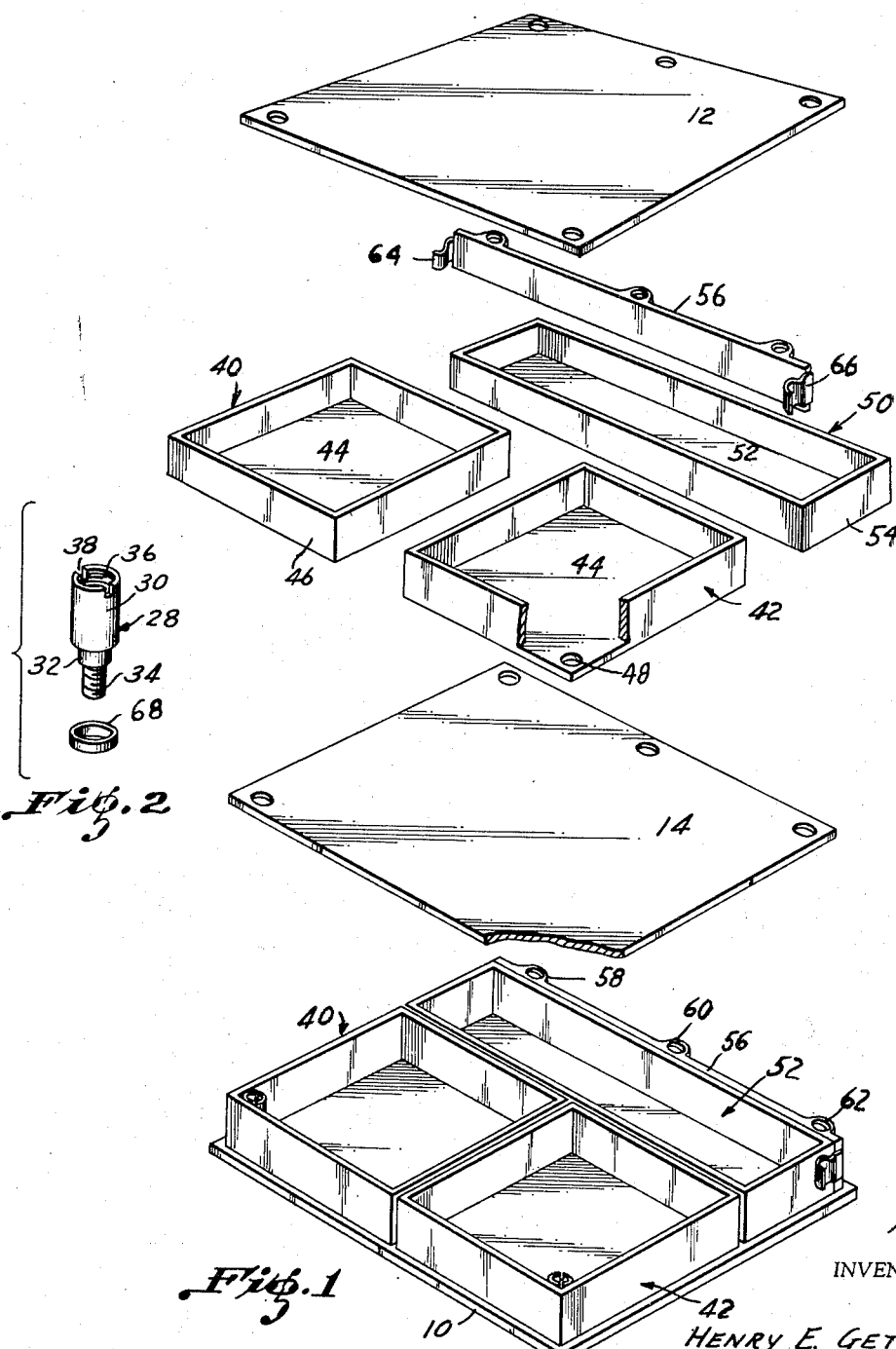

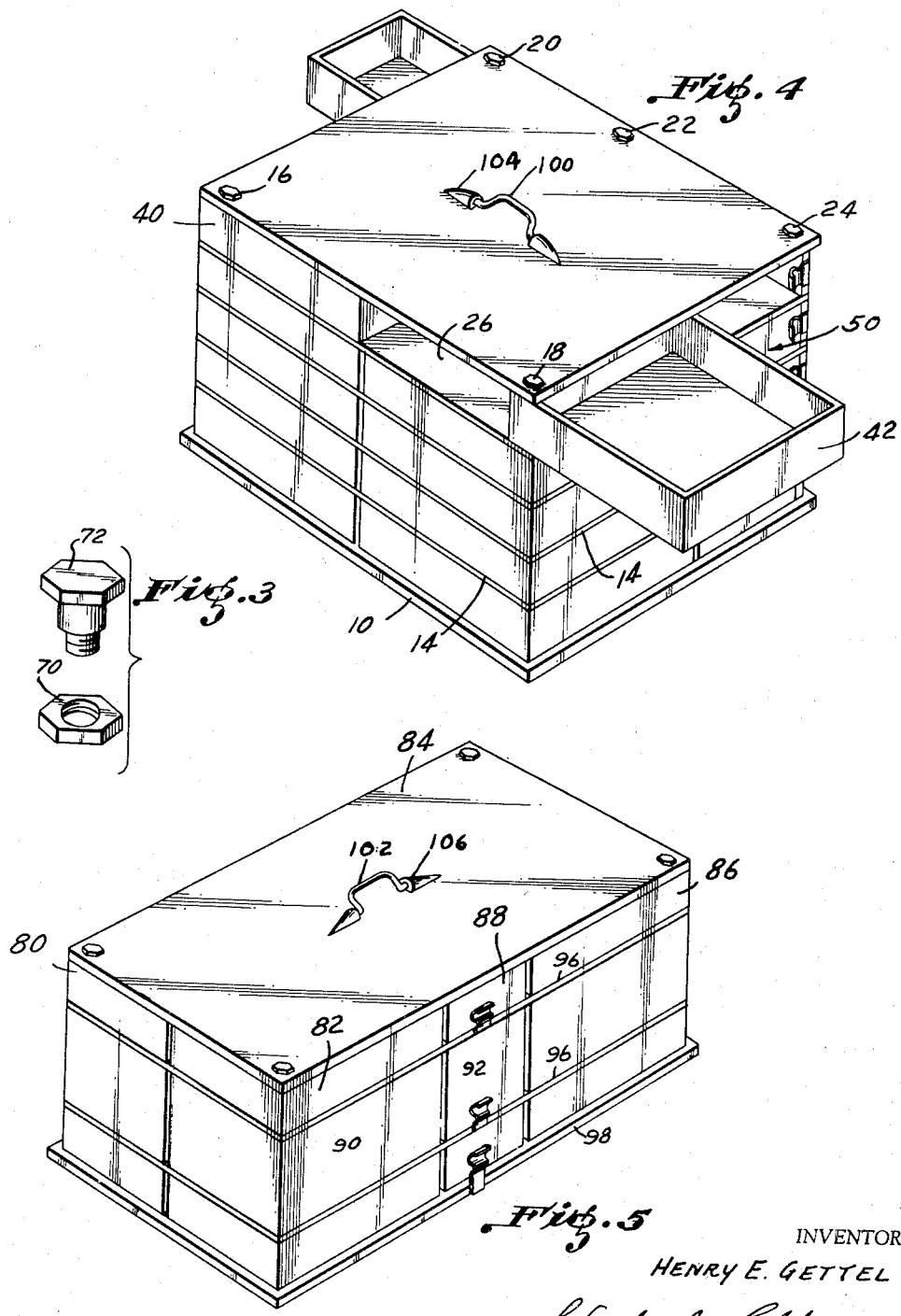

2,779,651

TACKLE BOX

Henry E. Gettel, Norman, Okla.

Application September 2, 1953, Serial No. 378,109

9 Claims. (Cl. 312—289)

This invention relates to containers, and in particular to a fishing tackle box.

The angler today carries a considerable quantity of fishing gear, and requires a tackle box to store his tackle, etc. It is important that a tackle box provide ready accessibility to all of the items the fisherman needs. It is, therefore, an object of this invention to provide a tackle box in which the tackle can be readily obtained by the fisherman as he needs it.

Further, the fisherman demands that the box be compartmented to separate his equipment in an orderly logical manner. Therefore, a further object of this invention is to provide a tackle box comprising a group of trays for conveniently arranging tackle, all of which trays are readily accessible to the fisherman.

A fisherman varies the amount of tackle which he carries on his fishing expedition. Often when he is going out for one kind of fish he will take less tackle than when he is going out for another kind of fish; also, when he is going on an extended trip or vacation he will take larger quantities or more varied tackle than when he is going out merely for a day. It is obvious that a single tackle box of any of the presently known types will not satisfy the requirements of the fisherman for all occasions. If a tackle box is purchased which is large enough to carry all of the varied equipment, much of it is not used or necessary when going on a day's fishing. Thus, the fisherman many times carries around a box having excess weight and an unneeded size. It is, therefore, yet another object of this invention to provide a variable tray tackle box with which trays can be added or subtracted by the fisherman prior to his contemplated trips, so as to provide a box which is suited for all occasions. The fisherman is not without adequate box space when he desires to carry a large amount of tackle, and he does not have to carry an unnecessarily large and cumbersome box when he only wishes to take along a small amount of tackle.

Among other objects of my invention are to provide a tackle box in which all the tackle is visible, and to provide a tackle box comprising a group of trays in which every tray is readily accessible yet in which the trays are always attached to the box so that they will not be lost, dropped, or the contents thereof spilled.

Instead of relying on trays which are removable, or which are positioned so that one must be removed from the box before the other can be examined, I provide a tackle box in which all the tackle is visible, and in which all the trays remain connected to the box proper, yet with which any tray can be moved to a position such that the tackle is exposed for removal.

These and other objects and advantages will become apparent from the following description and the accompanying drawing, in which:

Figure 1 is an exploded perspective view showing a fishing tackle box constructed in accordance with my invention.

Figure 2 is an exploded perspective view of a sectional securing screw or bolt forming a part of the invention.

Figure 3 is an exploded perspective view of fastening means forming part of the invention.

Figure 4 is a perspective view showing the elements of Figures 1 and 2 in their assembled relationship.

Figure 5 is a view showing a modified form of the invention.

Similar reference characters in the several views indicate similar elements.

Referring now particularly to the drawing, a tackle box constructed in accordance with my invention comprises a bottom plate 10 and a top plate 12, and a series of spaced intermediate plates 14. The top and bottom plates and the intermediate plates are all held in spaced parallel overlying relationship by front support posts 16 and 18, and rear support posts 20, 22 and 24. There are thus formed a group of chambers such as 26.

Each of the support posts comprises sectional securing screw members 28. The sectional screw member 28 has a main portion 30, a reduced portion 32 and a threaded end 34. In addition, internal threads 36 and slots 38 for receiving a screw driver are provided. Each post is formed by connecting as many of the screws 28 together as are necessary.

The tackle box further includes front trays such as 40 and 42, each of which comprises bottoms 44 and side members 46. In one corner each of the trays is provided with an opening 48. Bushing 68 is insertable in opening 48. The length of enlarged portion 30 of screws 28 corresponds to the height of the trays.

As illustrated in Figure 4, a pair of trays are provided in each of the chambers 26. Each chamber is also provided with a tray 50 comprising a bottom 52 and side and end members 54. As illustrated in Figures 1 and 4, tray 50 lies adjacent to or in abutting relationship to the front trays 40 and 42. Each chamber is also provided with a tray back for the sliding or locking tray 50. The tray back comprises a plate-like element 56 having bosses 58, 60 and 62 for receiving the screw members of posts 20, 22 and 24, respectively.

The tray back abuts the sliding tray 50. At each end the tray back has a spring clip 64 and 66 secured thereto in any convenient manner. The spring clips, as shown in Figs. 1 and 4, resiliently restrain sliding movement of tray 52. It is obvious that the trays 40 and 42, as well as the tray back 56, are placed on the plates 10 or 14 as the posts 16, etc. are being built up.

In assembling the tackle box bushing 68 is positioned in opening 48 with tray 42 over a front opening in bottom plate 10, and a screw 28 is inserted through the bushing and the bottom plate and a suitable nut, such as 70, is threaded onto the threads 34. Next tray 40 is placed in position in the same manner. Then a tray back 56 is placed in position and three screw members 28 inserted. Tray 50 can then be put in if desired. A plate 14 can now be positioned over the screws and bushings 68, trays 40—42, backs 56 and a tray 50 are positioned over the plate and a second set of screws 28 threadingly engaged in threads 36 of the previously placed screws. This is done until the required number of trays are provided, and then the top plate 12 is placed in position and screws 72 placed into the topmost screws 28. This is the manner in which each of the posts are formed, and in which the plates and trays are interconnected.

It should be apparent from an inspection of Figure 1 that the front trays 40 and 42 cannot be moved from their normal position, which is the position of tray 40 in Figure 4 until the sliding or locking rear tray is moved to one side or the other to an outward position, since the rear tray is in abutting relationship with the pivotally mounted front trays and the tray back. When the rear tray is moved to an outward position in which the contents thereof can be reached, one of the forward trays can also be pivoted to an outward position and the contents thereof removed. To pivot tray 42 it is necessary to move tray 50 to the left, while it is necessary to move tray 50 to the right to pivot tray 40.

Figure 5 shows a modified form of the invention in which pairs of front trays 80, 82 and 84, 86, are combined with rear trays 88 to produce a tackle box having even greater capacity. Note that large size trays 90—92 can be used, in either form of box. Also backs 56 can be dispensed within the form shown in Figure 5, if desired. Clips 94 can be attached to plates 96—98.

In both modifications of the invention I show handles 100 and 102, respectively, which can be attached to the box in any suitable manner. In the embodiments illustrated the handles can be snapped into suitable openings provided in bosses 104 and 106 which may be formed on the box or attached thereto.

To provide full view of the contents of the various trays I find it desirable to make the box of a transparent material, such as clear plastic. However, obviously any suitable material can be used.

It is apparent that the box can be used for the storing or carrying of any articles or supplies. It is not intended to limit the invention to a tackle box alone.

While I have shown and described a preferred form of my invention, it will be understood that variations in details of form may be made without departure from the invention as defined in the appended claims.

I claim:

1. A tackle box comprising a bottom plate, a top plate, means for supporting said top plate in spaced parallel relationship to said bottom plate, comprising a pair of front posts and a pair of back posts, a tray pivotally mounted on one of said front posts and movable into and out of a normal position in which said tray lies intermediate said top and bottom plates, means for retaining said tray in normal position comprising a second tray slidably mounted between said top and bottom plate and normally lying closely adjacent the first mentioned tray and preventing pivotal movement thereof, means resisting sliding movement of said second tray, said second tray being slidable outwardly of said plates to an outward position, the first mentioned tray being pivotal outwardly of its normal position when the second tray is in said outward position.

2. A tackle box comprising a pair of front posts and a pair of rear posts, means interconnecting said front and rear posts at both ends thereof and maintaining them in spaced vertical relationship, a tray connected to one of said front posts and pivotal thereon from a normal inward position intermediate said means connecting said posts to a position outwardly thereof, a second tray slidably supported on one of the means interconnecting said posts, and normally positioned intermediate said means interconnecting said posts, said second tray normally being positioned adjacent the first mentioned tray and preventing pivotal movement thereof, means resisting sliding movement of said second tray, said second tray being slidable outwardly of said means interconnecting said posts to an outward position, the first mentioned tray being pivotal to an outward position when said second tray is in its outward position.

3. A tackle box comprising a top plate and a bottom plate, said top and bottom plates being maintained in spaced overlying relationship by a pair of front posts and a rear post, each of said posts comprising sections, and means removably interconnecting said sections, each of said posts further having a main portion and a reduced section, a series of plates extending between said posts and receiving said reduced sections thereof and being maintained in fixed spaced relationship to said posts so as to form a series of parallel chambers, a tray pivotally connected to one of said front posts and positioned in each of said chambers, a second tray slidably mounted in each of said chambers and normally lying in abutting relationship with the first mentioned tray when said first mentioned tray is in a normal position intermediate said top and bottom plates, a tray back positioned at the rear of each chamber and connected to said rear post and having abutting relationship with the tray slidably mounted in said chamber, means connected to said tray back and resiliently resisting sliding movement of said second tray, said second tray being movable from its normal position to an outward position in which the contents of said tray are exposed, the first mentioned tray in each of said chambers being pivotal to an outward position to expose the contents thereof when its corresponding second tray is in its outward position.

4. A tackle box comprising front and rear posts, means forming the top of said box interconnecting said posts at one end thereof, means forming the bottom of said box interconnecting said posts at the other end thereof, a series of spaced plates connected to all of said posts and being maintained in spaced relationship thereby and being parallel to each other and to said means connecting said posts at the top and bottom thereof, a tray pivotally connected to one of said front posts and being normally positioned intermediate two of said plates, said tray being pivotal on said one of said front posts to an outward position in which the contents thereof are exposed, a second tray normally positioned intermediate said two of said plates and being slidably supported on the lower of said two of said plates, said second tray in its normal position abutting the first mentioned tray and preventing pivotal movement thereof, means resiliently restraining said second tray in normal position, said second tray being slidable to an outward position, the first mentioned tray being pivotal to an outward position when said second tray is in its outward position.

5. A tackle box comprising a top member and a bottom member, a front post and a rear post interconnecting said top and bottom members and holding them in spaced vertical relationshp, a series of plates interconnecting said front and rear posts and extending parallel to said top and bottom members and forming spaced chambers, a tray pivotally connected to said front post and extending into one of said chambers when in normal position, a second tray slidably mounted in one of said chambers at the rear thereof and normally being in abutting relationship with the first mentioned tray and preventing pivotal movement thereof, means resisting sliding movement of said second tray and normally restraining said second tray in its normal position, said second tray being slidable to an outward position in which the contents thereof are exposed, the first mentioned tray being pivotal to an outward position to expose the contents whereof when the second tray is in its outward position.

6. A tackle box comprising a top plate and a bottom plate, and a series of intermediate plates extending parallel to said top and bottom plates, all of said plates being maintained in spaced relationship by a pair of front posts and a pair of rear posts to form a series of spaced chambers, means forming a back for each of said chambers, and connected to said rear post, each of said chambers having a front tray pivotally connected to one of said front posts, and a second front tray pivotally connected to the other of said front posts, each of said chambers further having a locking tray comprising a tray slidably mounted in said chamber and abutting said back and said front trays when in normal position, spring clips connected to said backs for each of said chambers and normally engaging said locking tray, said locking tray being slidable outwardly of said chamber to an outward position in which at least one of said front trays can be pivoted outwardly of said chamber.

7. A tackle box comprising a top member and a bottom member, a front post and a rear post interconnecting said top and bottom members and holding them in spaced relationship, a tray pivotally connected to said front post and normally positioned intermediate said top and bottom members, a second tray slidably mounted in said box and normally having abutting relationship with the first mentioned tray and preventing pivotal movement thereof, said second tray being slidable to an outward position, the first mentioned tray being pivotal to a position outwardly of said top and bottom members when the second tray is in its outward position.

8. A tackle box comprising a top and a bottom member, means maintaining said members in spaced relationship, a tray, means pivotally mounting said tray intermediate said top and bottom members, a second tray slidably mounted intermediate said members, means normally retaining said trays in a normal position intermediate said members with said trays being in abutting relationship in said normal position, the first mentioned tray being retained in said normal position by the second mentioned tray when both said trays are in said normal position, the second mentioned tray being movable out of normal position to a second position and the first mentioned tray being pivotal out of its normal position when said second mentioned tray is in said second position.

9. A tackle box comprising a first tray and a second tray, means movably supporting said trays in said box in contact with each other with said trays being each movable in determined paths outwardly of said box and with one of said trays lying in the path of movement of the other of said trays, said one of said trays preventing movement of said other of said trays outwardly of said box when in said contact therewith, said one of said trays being movable outwardly of said box out of said path of movement of said other of said trays, said one of said trays being movable partly outwardly of said box while still in said contact with said other of said trays.

References Cited in the file of this patent

UNITED STATES PATENTS

| | | |
|---|---|---|
| 747,062 | Gill | Dec. 15, 1903 |
| 850,210 | Cady | Apr. 16, 1907 |
| 982,767 | Dunham | Jan. 24, 1911 |
| 1,023,425 | Harrison | Apr. 16, 1912 |
| 1,090,592 | Betham | Mar. 17, 1914 |
| 1,269,225 | Sciannamea | June 11, 1918 |
| 2,523,976 | Riet | Sept. 26, 1950 |